United States Patent
Lee et al.

(10) Patent No.: US 6,465,077 B1
(45) Date of Patent: Oct. 15, 2002

(54) BLACK LINE SCREENS AND METHODS OF MAKING SAME

(75) Inventors: Charles C. Lee, Little Canada; Terry L. Morris, Eagan; Stephen R. Stone, Saint Paul, all of MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/491,104

(22) Filed: Jan. 25, 2000

(51) Int. Cl.$^7$ .................................................. B32B 3/28
(52) U.S. Cl. ........................... 428/167; 428/30; 428/29; 428/141; 428/172; 428/195; 428/192; 428/409; 359/575; 359/567; 359/893; 427/145; 427/164; 427/276; 427/286; 427/299
(58) Field of Search .............................. 428/30, 29, 119, 428/141, 167, 172, 195, 192, 409; 359/478, 893, 558, 566, 567, 575; 427/145, 164, 177, 286, 275, 276, 299, 444

(56) References Cited

U.S. PATENT DOCUMENTS

| | | | |
|---|---|---|---|
| RE24,906 E | 12/1960 | Ulrich | |
| 3,264,164 A | * 8/1966 | Jerothe et al. | |
| 4,158,481 A | 6/1979 | Hoyer | ........................ 350/144 |
| 4,927,238 A | 5/1990 | Green et al. | |
| 5,035,929 A | 7/1991 | Myers et al. | |
| 5,113,213 A | 5/1992 | Sandor et al. | |
| 5,141,790 A | 8/1992 | Calhoun et al. | |
| 5,276,478 A | 1/1994 | Morton | |
| 5,278,608 A | 1/1994 | Taylor et al. | |
| 5,293,426 A | 3/1994 | Wouch et al. | .................. 382/1 |
| RE35,029 E | 8/1995 | Sandor et al. | |
| 5,519,794 A | 5/1996 | Sandor et al. | |
| 5,663,801 A | 9/1997 | Hada et al. | .................. 358/299 |
| 5,782,026 A | 7/1998 | Capie | |
| 5,966,105 A | 10/1999 | Gundlach | |
| 6,277,485 B1 | * 8/2001 | Invie et al. | |

FOREIGN PATENT DOCUMENTS

| | | | |
|---|---|---|---|
| GB | 2 252 175 | 7/1992 | ........... G02B/27/22 |
| JP | 07-244 343 | 9/1995 | ........... G03B/35/18 |

OTHER PUBLICATIONS

*RST Plus Technical Reference Manual*, Wyko Corp., Apr. 1995, 2$^{nd}$ ed. 980–078 Ref. A, pp. 2–1 to 2–16.
*Transmission Reflection Densitometer TR–927 Operator's Manual*, Macbeth, A division of Kollmorgen Corp., 1980. No Month.

* cited by examiner

Primary Examiner—Deborah Jones
Assistant Examiner—Wendy Boss

(57) ABSTRACT

A viewing device comprising a media having a lineal pattern of alternating transparent and non-transparent regions printed thereon, wherein the non-transparent regions comprise edges having an Edge Roughness greater than about 2 micrometers.

43 Claims, 1 Drawing Sheet

BLACK LINE SCREENS AND METHODS OF MAKING SAME

FIELD OF THE INVENTION

The present invention relates broadly to articles that transform interleaved images into special effects images by conveying depth perception. Specifically, the invention relates to black line screens that can be positioned over an interleaved image, and are producible in a variety of sizes and character.

BACKGROUND OF THE INVENTION

A variety of viewing devices have been developed that are capable of transforming flat, printed images into special effect or impact-producing images, such as 3D, motion, or animation. These images are often used for advertising, to catch viewers' eyes as they pass by, as well as for decorative purposes to achieve attention-grabbing effects. Commonly used devices that are placed over printed images include lenticular lens sheets, barrier strip systems and black line screens. These devices are generally mounted on media which hold interleaved images. The interleaved images are frequently made using computer assisted photographic interlacing techniques.

U.S Pat. No. 5,035,929 teaches a three-dimensional (3D) picture having a transparent substrate with non-transparent lines on the top surface and a photographic picture on the bottom surface.

U.S. 4,927,238 provides 3D displays using a black line viewing screen having parallel lines, a photographic image, air space, a supporting frame, and an illuminating light box.

Black line screens are generally made from a clear plastic film. Evenly spaced dark parallel lines are then printed or deposited onto one surface of the film. Conventional methods of printing include silk screen printing, offset, lithography, photography, thermal ink jet, and piezo ink jet. These methods, in the past, however, are only able to print on substrates that are limited in size and quality. Large poster sized images that can be spotted from many yards away are currently only able to be transformed into special effects images using lenticular lenses. Fabrication of lenticular lenses, however, can be costly and difficult. Lenticular lenses also become quite heavy and cumbersome during assembly. Thus it would be advantageous to assemble special effects images having a black line screen.

It would be highly advantageous to provide black line screens in a variety of sizes, including large and extra-large sizes, yet still be effective in providing depth and parallax to achieve special effects imaging.

SUMMARY

To achieve larger-than-life size special effects images, black line screen viewing devices are provided that can be fabricated in sufficiently large sizes and be layered over interleaved images. The devices can also be provided in very small sizes for making closely observed special effects images. Methods of producing and using the black line screen viewing devices are also provided As used herein, the following terms are intended to have the following meanings:

"special effects imaging" is used to describe a class of graphic imaging techniques that produce, for example, 3D graphics, flip images, animation, motion, flip-motion, or a combination thereof;

"interleaved image" means a composite image made using the process of interlacing narrow slices or strips taken from multiple yet different images;

"black" means the absorption of all colors; the term is intended to encompass very deep dark colors that are in drastic contrast to white, and such colors may or may not fall under the category of black, per se.

"transparent" is descriptive of an area through which images, color, and light can be seen.

In one aspect of the invention, a viewing device is provided having a lineal pattern of alternating transparent and non-transparent regions printed on a media, where the non-transparent regions have edges that have an Edge Roughness greater than 2 micrometers.

In another aspect of the invention, a viewing device is provided in a continuous roll form suitable for automated manufacturing lines.

BRIEF DESCRIPTION OF THE DRAWINGS

The invention will be more fully appreciated by referring to the following non-limiting drawings in which.

DETAILED DESCRIPTION OF THE PREFERRED EMBODIMENTS

Figure 1:
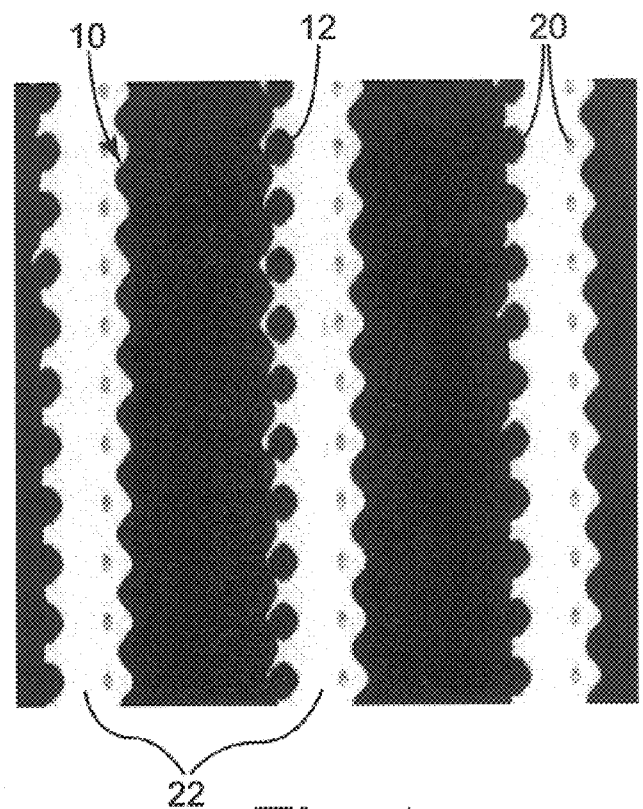
FIG. 1 is a digital image of a portion of a black line screen made using a preferred process.

The present invention provides black line screens of varying sizes and character, and methods for making such screens. The articles of the invention overcome current size limitations for special effects images by providing a sufficiently large viewing device that can be placed over an interleaved image. By providing the black line screens of the invention, clean special effects images that are at least the size of billboards, can be achieved.

A further advantage of the viewing devices of the invention is that the screens can be provided in a continuous roll form; i.e., the screens can be provided in a roll such that it can be unwound and used with automated manufacturing equipment. Black line screens in roll format are desirable for efficient, low-cost, and low waste manufacturing. Cutting the rolls or providing the device in sheet format can also be achieved with the present invention.

In a preferred process, the lines can have substantially no discontinuities throughout the print area that may obscure the special effect image. Thus, advantageously, the viewing device of the present invention can be provided in sizes greater than about 40 inches in length. Preferably, the device is provided in sizes greater than about 96 inches in length. The viewing device of the present invention can be provided in sizes greater than about 30 inches in width. Preferably, the device is provided in sizes greater than about 48 inches in width.

Surprisingly, it has been found that black line screens comprised of non-transparent lines that have somewhat jagged yet consistently jagged edges still provide sufficient light barrier to effectuate parallax and create special effects images. Parallax would not be achieved effectively if line edges have discontinuities or gross irregularities that mislead a human eye or make it difficult for an observer to see intended portions of images. As used herein, "jagged" is meant to be in contrast to edges that have substantially no variability within itself, from one point to another. For example, a series of parallel lines with edges that appear serrated have been found to provide an effective black line screen viewing device. Preferably the non-transparent regions are monochrome.

More quantitatively, the jagged-ness can be quantified using an Edge Roughness Test as described in the Test Method below (based on the Levenberg-Marquardt approach (*Numerical Recipes in Pascal: the art of scientific computing,* by W. H. Press, B. P. Flannery, S. A. Teukolsky, W. T. Vetterling, 1989, Cambridge University Press, Cambridge, p.759)). The value obtained from using the Edge Roughness Test is indicative of the average variability an edge possesses, where the variability is measured at numerous, random points along an edge. The distance from peaks to valleys are measured. The viewing devices of the present invention have an Edge Roughness greater than about 2 micrometers ($\mu$m) preferably, the Edge Roughness is greater than about 4 micrometers. The Edge Roughness of the devices may be greater than about 7 micrometers and most preferably be between about 3 to 7 micrometers.

The appearance of the non-transparent regions (i.e. black lines) can also be described by quantifying the transparent regions that lay between the lines. Using the Average Width Variation Test described in the Test Method below, it has been found that transparent regions having an average width variation greater than about 5 micrometers; more preferably, the average width variation is greater than about 10 micrometers; most preferably, the average width variation is greater than about 12 micrometers.

The relationship between the transparent regions and the non-transparent regions can be described in terms of pitch and also as a ratio. The pitch of the black line pattern can be from about 1 to about 200 lines per inch (lpi), depending upon the desired special effects image that is trying to be achieved. Preferably, the pitch is 5–100 lpi and more preferably the pitch is 10–40 lpi. The ratio of the non-transparent region to the transparent region is preferably between about 1:1 to about 9:1.

The non-transparent regions are preferably linear, parallel, and printed in a series having transparent regions between each line. The non-transparent lines can be printed or deposited onto a substrate by different methods, including for example, flexographic, gravure, electrostatic, silk screen, photographic and plate press. A preferred process is gravure printing, an intaglio printing process that can provide precision printing. Gravure printing processes utilize an image carrier that has an image cut or etched onto it with thousands of tiny recessed cells. The cells carry ink which, when contacted under pressure with the clear film substrate, is drawn out of the cells by capillary action.

The gravure image carrier is generally a copper-clad cylinder. Alternatively, the carrier can be other engravable or etchable materials, such as for example, brass, acrylic, steel and nickel. The cylinder is preferably made of steel.

The cells on the carrier can be made by various methods, including for example, electro-mechanical engraving, acid etching, laser engraving, and knurling. A particularly preferred method of creating the cells is the use of electro-mechanical engraving with a diamond tip stylus. Optionally, a hard-coat can be applied over the carrier surface and the cells. Chrome, ceramic, nickel, and titanium are materials generally suitable for hard-coating.

The cells on a gravure image carrier are preferably substantially pyramidal or quadrangular in shape. However, other three dimensional shapes having a known volume can be recessed into the gravure image carrier. Examples include tetrahedrals, rhomboids, crater-like pits etc. The cell volume factor, a known term in the industry, is the amount of ink that the cells hold based on a specific area can be selected to achieve a desired opacity and level of print uniformity. The cell volume factor is preferably between about 5 to 20 billion $\mu^3$/in$^2$; more preferably the cell volume factor is between about 7 to about 15 billion $\mu^3$/in$^2$; most preferably the cell volume factor is between about 8 to about 10 billion $\mu$m$^3$/in$^2$.

The edges of the non-transparent regions (lines) printed on the substrate will depend on the gravure image carrier's cell shape. It has been surprisingly found that cells having a pyramidal shape impart a line having sinusoidal-like edges. However, although the edges may seem serrated or sinusoidal, the black line screens of the present invention are sufficiently contrasting and predictable in pattern such that the screen is an effective parallax-providing viewing device that can transform interleaved images into special effects images. Other shapes of cells may be used in the process of making the black line screens of the invention, and may result in a different look for the edges.

Referring now to FIG. 1, a preferred embodiment of the present invention is shown, having a pattern of transparent and non-transparent regions. Edges 10 and 12 of the non-transparent regions appear sinusoidal. A plurality of marks 20 may appear due to cells created during transition time between engraving and non-engraving during the cell creation process. Transparent regions 22 lie between printed non-transparent regions.

A variety of inks, pigments, or dyes in the form of fluid, solid pellets, ribbons, cartridges, or other forms that are designed for use with printing processes may be used in the methods of the present invention. Selection of the ink will generally relate to a desired color, intensity and an ink's ability to adhere to a substrate. In practicing the preferred process of gravure printing onto plastic media, suitable inks include solvent-based, aqueous based, and radiation curable inks. A preferred ink is a solvent-based thermally dried blend of pigmented resins. Also preferred are thermally curable inks, as these tend to also adhere well to plastic substrates. Suitable inks include, for example, products having the trade designations of SUNSHEEN, AQUAKING, or HYDROPET, all of which are commercially available from Sun Chemical Corp. (Fort Lee, N.J.), as well as products having the tradename POLYGLOSS, commercially available from Flint Ink (Ann Arbor, Mich.). Alternatively, the ink may be a UV-curable ink.

The viscosity of the ink in a gravure printing process should be sufficiently thin so as to be considered a "printable" viscosity. Depending upon the initial viscosity that the ink is provided in, a practitioner may wish to thin the fluid with a compatible solvent to achieve a printable viscosity. A preferred operating range for the ink viscosity is between about 40 to about 100 centipoise (cP), measured at normal room temperature and atmospheric pressure.

It is generally preferred that non-transparent regions on a black line screen have sufficient opacity to block out portions of the interleaved image, as intended by design. Maximum contrast between the printed lines and the transparent non-printed regions is preferable. Colors of dark purple, dark brown, dark blue and black are preferable to provide good barriers, where black colored lines are most preferred. Quanitatively, to achieve effective parallax and to clearly observe a special effects image, it is preferred that the lines appear very dark and have high optical density. It is preferred to measure optical density using a MacBeth Transmission Reflection Densitometer TR-927 (Newburgh, N.Y.). The monochrome lines on the screens of the invention preferably have an optical density greater than about 1.4 when measured in transmission mode; more preferably the lines have an optical density of greater than about 1.8; most preferably greater than about 2.

The black line screen viewing device of the present invention comprises a clear substrate upon which lines are printed or deposited. Either thermoplastic or thermoset substrates that are dimensionally stable when exposed to heat or other energy are preferred. Suitable substrates include vinyl films, polyester films, cellophane, and polyolefins such as some polyethylenes and polypropylenes. To provide flexibility in some substrates, plasticizers can be incorporated in the substrate's composition. A particularly preferred substrate is an optically clear polyester teraphtalate. Glass can also be used as a substrate. The thickness of the substrate can be between about 50 $\mu$ to about 15 cm; preferably the substrate is between about 60 $\mu$m to 1000 $\mu$m thick; more preferably the substrate is 70 $\mu$m to 175$\mu$m thick. The clarity of the substrate that appear as transparent regions preferably has a high light transmission capability, based on ASTM D1003. Preferably, the substrate has a light transmission capability of greater than about 70% (about 0.15 optical density); more preferably the substrate has greater than about 80% light transmission, (about 0.10 optical density); and most preferably the substrate has greater than about 90% light transmission (about 0.05 optical density).

It may be desirable to pre-treat the substrate with heat prior to applying the non-transparent linear regions. Heat pre-treatment helps avoid shrinkage of the substrate during the ink drying process. Preferably, the heat pre-treatment is performed at a temperature between about 120° C. and 150° C.

A primer can optionally be applied onto the substrate to enhance adhesion of ink onto the substrate. A preferred compound suitable for use in the articles and methods of the invention include for example, a blend of polyester and vinyl resin mixed in a solvent. The primer can be applied in-line with the printing process prior to the ink application. Alternatively, a substrate may be provided pre-treated with a primer (i.e. performed off line). A preferred substrate suitable for use in the present invention is a polyester film comprising a pre-treated surface available from DuPont Films (Wilmington, Del.) under the product designation MYLAR J100. Application of a primer can be accomplished in various ways including, for example, gravure coating, spraying, powder coating, and dipping. The primer can be wet or dry prior to printing the black lines on the substrate but preferably the primer is dry. Drying the primer can be done by any conventional drying methods compatible with the type of priming compound applied. For example, UV curable primers are preferably dried and cured onto a substrate using UV light. Powdered primers applied by electrostatic techniques can be fused onto a substrate using heat and pressure. Other suitable drying methods include conductive, convective or radiant heating, or a combination thereof A preferred method of making the black line screen of the present invention comprises the steps of: a) providing a printable substrate; b) providing a printable ink; and c) printing a series of substantially even spaced parallel linear regions on the substrate using the printable ink.

In preferred embodiments of the invention, the black line screen viewing devices of the invention are assembled with a media having an interleaved image printed on it. Generally, a spacer is required between an interleaved image and a black line screen viewing device that comprises a film. Alternatively, the spacer may be provided by the thickness of the media holding an interleaved image, or a media having a pre-attached or adjacent spacer. In a further alternative, the spacer may be provided by the thickness of a viewing device substrate that is sufficiently thick to initiate depth perception, or a viewing device substrate having a pre-attached or adjacent spacer.

A spacer is defined as any visible light transparent medium. Preferably, the spacer has a light transmissivity of at least about 75% (based on ASTM D1003). The spacer functions as a gap to provide a distance (depth) between an image and a black line screen to achieve flip or 3D effects. A preferred material for a spacer is a thermoplastic poly (methylmethacrylate) polymer product commercially available from Elf-Atochem S.A., under the trade designation PLEXIGLAS. Other suitable materials that may be used as spacers include glass, acrylic or a polycarbonate material such as a product available from GE Plastics under the trade designation LEXAN. Alternatively, the spacer can be a volume of air between the interleaved image and the black line screen. Generally, the amount of air or the thickness of a spacer is a function relative to the pitch of a viewing device and the anticipated viewing distance of the observer from the special effects image.

Interleaved images are preferably printed on film media that range in thickness from about 0.002 inches to about 0.020 inches. Alternatively, the interleaved image can be printed or deposited directly on a surface of a spacer, where the spacer is clear or transparent, as described above. For media having pre-attached spacers, the thickness can be up to about 15 cm. The media is preferably a film; however other suitable substrates for the methods of the invention include, for example, glass and paper. The interleaved images can be printed or deposited on the substrate by one of a variety of suitable methods, including screen print, offset print, photography, electrostatic, gravure, inkjet, digitization, thermostatic, electronic display, lithographic, flexographic, electrophotographic or other conventional imaging methods.

Any of the substrates of the special effects image assembly may be coated with an adhesive. The coating step may be done on-site at the installation site or fabricator shop, or alternatively performed at a manufacturing facility to provide pre-coated substrates. Preferably, the adhesive is in the form of a pre-coat of a pressure sensitive adhesive dried or cured onto substrate that can provide adhesion and immobilization between layers. A preferred adhesive is taught in U.S. Reissue Pat. No. 24,906 which teaches a pressure sensitive adhesive useful on sheet material, comprising a pressure sensitive adhesive (PSA) made from an acrylic base.

To ensure clarity of the assembled special effects image, it is desirable that the adhesive on a substrate be smooth. The substrate could be a spacer, the media which holds an interleaved image, a black line screen, or a combination thereof Surface roughness of a PSA can be influenced by its release liner due to the close contact with which the release liner has to the PSA. Thus, to achieve an optically clear special effects image, it is preferred that a substrate having a pre-coated PSA comprise a release liner that imparts low surface roughness. A very rough surface could lead to a hazy image. Smoothness of the adhesive also ensures continuous contact and good adhesion between layers.

Quantitatively, the surface roughness of a release liner can be measured using the "RST Plus Surface Profiling system" which computes surface parameters that provide information about roughness and surface profile. (RST Plus Technical Reference Manual, Wyko Corp., April 1995 2nd ed.

980-078 Rev. A). The substrates having a pre-coated PSA preferably have a release liner that has a surface roughness, R1. less than about 15 μm; more preferably less than about 10 μm. A preferred material for use as a release liner for PSA coated substrates is silicone-coated polyester (PET).

In practice, the black line screen of the present invention is preferably layered onto a surface of a spacer, where the surface is opposite the surface upon which an interleaved image is positioned. Alternatively, in the instance where an interleaved image may be printed directly onto one surface of a thick substrate, the black line screen may be adhered to the opposite surface of the image itself. A particularly preferred method of assembling a special effects image that comprises a black line screen is taught in U.S. patent application Ser. No. 09/491,103, filed on even date with the present invention and is commonly assigned. The disclosure of this application is hereby incorporated by reference.

Adhesion between the layers may be accomplished by having a coating of adhesive on one or both of the substrates/layers. Optionally, both sides or surfaces of a black line screen viewing device can be pre-coated with an adhesive.

Test Method

Edge Roughness

Images were taken of (1) a preferred embodiment of a black line screen fabricated using a gravure printing process, on a polyester media; and (2) a comparative black line screen made using a photographic technique. The images were obtained by using an INFINIVAR video microscope (Infinity Photo-Optical Co.; Boulder, Colo.) and a JVC TK1270 color video camera attached attached to a LEICA Q-570 image analyzer (Leica MicroSystems Wetzlar GmbH). The system was calibrated using a stage micrometer from Graticules, Ltd. (Kent, England). The images were analyzed using the Q-570 software to obtain the calibrated x-y coordinates of 480 points (randomly selected) on each edge (transparent to printed interface) for curve fitting. For Example 1, curve fitting was used to obtain the amplitude and wavelength of the sinusoidal edges. The x-y data points for each edge were then fit to the following equation $$y = A * \operatorname{Sin}(x*((2*pi)/wl)-q) + \text{Offset} + m*x$$

using the Levenberg-Marquardt approach (*Numerical Recipes in Pascal: the art of scientific computing,* by W. H. Press, B. P. Flannery, S. A. Teukolsky, W. T. Vetterling, 1989, Cambridge University Press, Cambridge, p.759) where A=amplitude (peak to valley)

wl=wavelength (peak to peak)

The roughness was calculated as the average absolute difference between the measured y coordinates and the calculated y values.

Average Width Variation

Using the same images taken from the Edge Roughnes Test, the average variation in width of the transparent regions, over a length of 2.5 millimeters (mm) was measured. The average variation in width is defined by the standard deviation of the measured widths. For Example 1, a preferred embodiment of the invention, the average width is 299.24 micrometers and the average variation in the width of the transparent region is 14.23 micrometers.

EXAMPLES

Table 1 shows a representation amount of the data gathered from a preferred embodiment of a black line screen of the invention. Referring now to FIG. 1, edges 10 and 12 were obtained when a gravure printing process was used, where the gravure carrier cells are pyramidal in shape. Marks 22 are where "transition cell marks". The width of the transparent region and a standard deviation is also reported in Table 1. The standard deviation column represents the average variation in width of the transparent region over a length of 2.5 millimeters. Thus, the average width is 299.24 micrometers+/−4.91 micrometers and the average variation in the width of the transparent region is 14.23 micrometers +/−2.20 micrometers.

Figure 2:
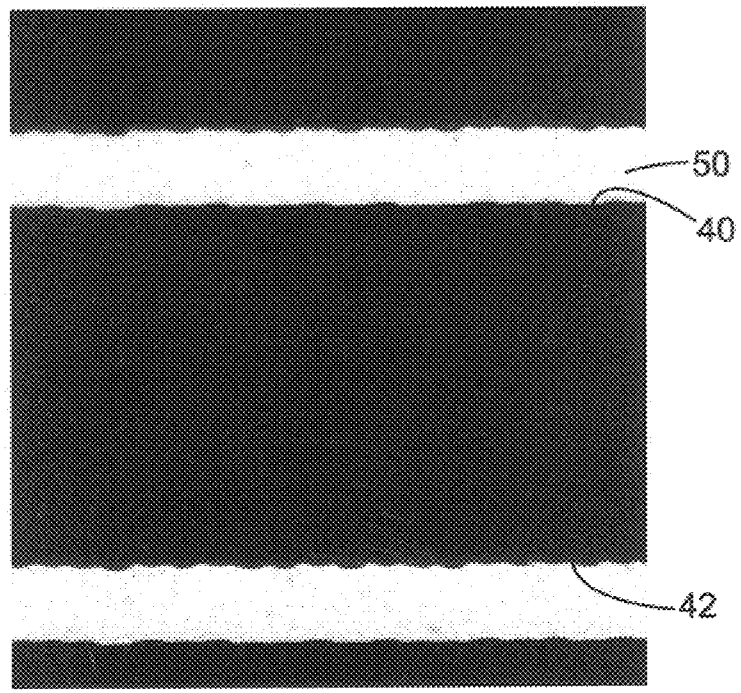
FIG. 2 is a digital image of a portion of a black comparative line screen made using a photographic printing technique.

In Table 2, a representative amount of data gathered from the photographically generated black line screen (comparative) is shown. Now referring to FIG. 2, a portion of a comparative black line screen made using photographic techniques is shown, where the non-transparent region has edges 40 and 42 and a transparent region 50.

TABLE 1

| | Edge Roughness (μm) | | | | | | Transparent Region 20 Average Width Variation | |
|---|---|---|---|---|---|---|---|---|
| | Edge 10 | | | Edge 12 | | | | |
| | A | WL | Roughness | A | WL | Roughness | Width | Std. Dev. |
| | 92.956 | 236.675 | 6.051 | 68.226 | 236.801 | 2.738 | 302.8 | 12.4 |
| | 88.202 | 236.791 | 5.88 | 60.478 | 236.963 | 3.789 | 301.9 | 12.7 |
| | 98.27 | 236.434 | 9.761 | 60.888 | 235.833 | 5.531 | 297.5 | 17.9 |
| | 88.9 | 236.472 | 6.306 | 63.888 | 236.741 | 2.186 | 301.6 | 12.6 |
| | 100.952 | 237.467 | 7.732 | 64.738 | 236.811 | 2.185 | 304.5 | 17.4 |
| | 89.216 | 236.734 | 7.526 | 65.374 | 236.444 | 2.6 | 303.8 | 11.8 |
| | 91.38 | 239.189 | 6.556 | 61.66 | 239.886 | 2.925 | 295 | 14.4 |
| | 86.38 | 240.337 | 5.967 | 56.014 | 240.558 | 2.537 | 296.3 | 13.8 |
| | 94.02 | 239.725 | 7.289 | 61.712 | 239.323 | 2.873 | 289.8 | 15.1 |
| Average | 92.25 | 237.76 | 7.01 | 62.55 | 237.71 | 3.04 | 299.24 | 14.23 |
| Std. Dev | 4.84 | 1.55 | 1.25 | 3.50 | 1.72 | 1.05 | 4.91 | 2.20 |
| Min | 86.38 | 236.434 | 5.88 | 56.014 | 235.833 | 2.185 | 289.8 | 11.8 |
| Max | 100.952 | 240.337 | 9.761 | 68.226 | 240.558 | 5.531 | 304.5 | 17.9 |

TABLE 2

Comparative Example

| | Edge Roughness (μm) | | | | | | Transparent Region 50 Average Width Variation | |
|---|---|---|---|---|---|---|---|---|
| | Edge 40 | | | Edge 42 | | | | |
| | A | WL | Roughness | A | WL | Roughness | Width | Std. Dev. |
| | 1.4 | 234.924 | 1.101 | 1.86 | 229.181 | 1.627 | 134.36 | 2.38 |
| | 1.54 | 214.3 | 1.487 | 1.66 | 214.976 | 1.393 | 132.1 | 2.31 |
| | 0.74 | 219.673 | 1.432 | 1.42 | 178.26 | 1.486 | 138.77 | 2.38 |
| | 0.94 | 217.79 | 1.437 | 1.26 | 226.37 | 1.835 | 136.15 | 2.41 |
| Average | 1.16 | 221.67 | 1.36 | 1.55 | 212.20 | 1.59 | 135.35 | 2.37 |
| Std. Dev | 0.38 | 9.11 | 0.18 | 0.26 | 23.44 | 0.19 | 2.82 | 0.04 |
| Min | 0.74 | 214.3 | 1.101 | 1.26 | 178.26 | 1.393 | 132.1 | 2.31 |
| Max | 1.54 | 234.924 | 1.487 | 1.86 | 229.181 | 1.835 | 138.77 | 2.41 |

What is claimed:

1. A black line screen viewing device for resolving slices of an interleaved image and producing a special effects image, said device comprising a media having a lineal pattern of alternating transparent and non-transparent regions printed thereon,
    wherein said non-transparent regions comprise two edges, each edge having an Edge Roughness greater than about 2 micrometers, and said black line screen viewing device, when laid over an interleaved image, resolves said slices of said interleaved image and creates a special effects image.

2. The device of claim 1 wherein said Edge Roughness is greater than about 4 micrometers.

3. The device of claim 1 wherein said Edge Roughness is greater than about 7 micrometers.

4. The device of claim 1 wherein said transparent regions have an average variation in width greater than about 5 micrometers.

5. The device of claim 1 wherein said transparent regions have an average variation in width greater than about 10 micrometers.

6. The device of claim 1 wherein said device is provided in continuous roll form.

7. The device of claim 1 wherein said device is provided in sheets.

8. The device of claim 1 wherein said non-transparent regions have an optical density greater than about 1.4.

9. The device of claim 1 wherein said non-transparent regions have an optical density greater than about 1.8.

10. The device of claim 1 wherein said non-transparent regions have an optical density greater than about 2.

11. The device of claim 1 wherein said transparent regions are greater than 70% light transmissive.

12. The device of claim 1 wherein said transparent regions are greater than 80% light transmissive.

13. The device of claim 1 wherein said transparent regions are greater than 90% light transmissive.

14. The device of claim 1 wherein a spacer is laid between said device and said interleaved image.

15. The device of claim 1 wherein said device is greater than 40 inches in length.

16. The device of claim 1 wherein said device is greater than 96 inches in length.

17. The device of claim 1 wherein said device is greater than 30 inches in width.

18. The device of claim 1 wherein said device is greater than 48 inches in width.

19. The device of claim 1 wherein said media is a thermoplastic material.

20. The device of claim 1 wherein said media is a thermoset plastic material.

21. The device of claim 1 wherein the ratio of non-transparent regions to transparent regions is between about 1:1 to about 9:1.

22. A method of making a black line screen viewing device comprising:
    (a) providing a printable substrate:
    (b) providing a printable ink; and
    (c) printing a lineal pattern of alternating transparent and non-transparent regions on said substrate, wherein said non-transparent regions comprise two edges, each edge having an Edge Roughness greater than about 2 micrometers,
    wherein said substrate after having said lineal pattern printed on it, and when laid over an intended interleaved image, resolves slices of an interleaved image and creates a special effects image.

23. The method according to claim 22 further comprising a step
    d) applying a primer to said substrate.

24. The method according to claim 22 wherein said printing is performed by a gravure process.

25. The method according to claim 24 wherein said gravure process comprises a gravure cylinder having a plurality of pyramidal cells.

26. The method according to claim 22 wherein said edges have an Edge Roughness greater than about 4 micrometers.

27. The method according to claim 22 wherein said edges have an Edge Roughness greater than about 7 micrometers.

28. The method according to claim 22 wherein said transparent regions have an average variation in width greater than about 5 micrometers.

29. The method according to claim 22 wherein said transparent regions have an average variation in width greater than about 10 micrometers.

30. The method according to claim 22 wherein said device is provided in continuous roll form.

31. The method according to claim 22 wherein said device is provided in sheets.

32. The method according to claim 22 wherein said non-transparent regions have an optical density greater than about 1.4.

33. The method according to claim 22 wherein said non-transparent regions have an optical density greater than about 1.8.

34. The method according to claim 22 wherein said non-transparent regions have an optical density greater than about 2.

35. The method according to claim 22 wherein said transparent regions are greater than 70% light transmissive.

36. The method according to claim 22 wherein said transparent regions are greater than 80% light transmissive.

37. The method according to claim 22 wherein said transparent regions are greater than 90% light transmissive.

38. The method according to claim 22 wherein said device is greater than 40 inches in length.

39. The method according to claim 22 wherein said device is greater than 96 inches in length.

40. The method according to claim 22 wherein said device is greater than 30 inches in width.

41. The method according to claim 22 wherein said device is greater than 48 inches in width.

42. The method according to claim 22 wherein said substrate is a thermoplastic material.

43. The method according to claim 22 wherein said substrate is a thermoset plastic material.

* * * * *